(12) United States Patent
Howard et al.

(10) Patent No.: US 8,050,138 B2
(45) Date of Patent: Nov. 1, 2011

(54) BALLISTIC-ACOUSTIC TRANSDUCER SYSTEM

(75) Inventors: Robert J. Howard, Clifton, VA (US); Antonio Paulic, Arlington, VA (US); John W. Rapp, Manassas, VA (US)

(73) Assignee: Lockheed Martin Corporation, Bethseda, MD (US)

( * ) Notice: Subject to any disclaimer, the term of this patent is extended or adjusted under 35 U.S.C. 154(b) by 305 days.

(21) Appl. No.: 12/409,925

(22) Filed: Mar. 24, 2009

(65) Prior Publication Data

US 2010/0246321 A1 Sep. 30, 2010

(51) Int. Cl.
*H04B 1/59* (2006.01)

(52) U.S. Cl. ............... 367/5; 367/99; 367/118; 367/141

(58) Field of Classification Search .............. 367/99, 367/118, 131, 142, 2–5, 141
See application file for complete search history.

(56) References Cited

U.S. PATENT DOCUMENTS

| | | | |
|---|---|---|---|
| 1,107,948 A | 8/1914 | Hoagland | |
| 2,617,874 A | 11/1952 | Lewis | |
| 2,986,973 A | 6/1961 | Waxman | |
| 3,053,220 A | 9/1962 | Sawyer | |
| 3,077,944 A | 2/1963 | Padberg, Jr. | |
| 3,115,831 A | 12/1963 | Suter | |
| 3,237,151 A * | 2/1966 | Thorpe | 367/5 |
| 3,282,216 A | 11/1966 | Calfee | |
| 3,327,968 A | 6/1967 | Converse | |
| 3,433,202 A | 3/1969 | Sharp et al. | |
| 3,434,425 A | 3/1969 | Critcher | |
| 3,444,508 A * | 5/1969 | Granfors et al. | 367/3 |
| 3,476,048 A | 11/1969 | Barr et al. | |
| 3,588,794 A | 6/1971 | Francis | |
| 3,895,687 A | 7/1975 | McLaughlin, Jr. et al. | |
| 3,915,092 A | 10/1975 | Monson et al. | |
| 3,919,684 A | 11/1975 | Reed | |
| 3,952,833 A | 4/1976 | Reed et al. | |
| 4,300,654 A | 11/1981 | Raymond et al. | |
| 4,346,779 A | 8/1982 | Mannin | |
| 4,725,988 A * | 2/1988 | Secretan | 367/4 |
| 4,775,028 A * | 10/1988 | de Heering | 181/124 |
| 5,231,609 A * | 7/1993 | Gaer | 367/99 |
| 5,283,767 A * | 2/1994 | McCoy | 367/4 |
| 5,339,281 A * | 8/1994 | Narendra et al. | 367/5 |
| 5,341,343 A | 8/1994 | Aske | |

(Continued)

OTHER PUBLICATIONS

Krol, W.P., Jr.; Cho, C.P.; , "High energy density permanent magnetic motors for underwater systems," Autonomous Underwater Vehicle Technology, 1996. AUV '96., Proceedings of the 1996 Symposium on Autonomous Underwater Vehicles, pp. 448-454, Jun. 2-6, 1996.*

*Primary Examiner* — Thomas Tarcza
*Assistant Examiner* — James Hulka
(74) *Attorney, Agent, or Firm* — Schwegman, Lundberg & Woessner, P.A.

(57) ABSTRACT

A ballistic-acoustic transducer system includes a processor and one or more acoustic sensors. The sensors are positioned in a body of water and are in communication with the processor. The system is configured such that acoustic energy generated by a non-explosive projectile as it impacts the water, enters the water, and sinks through the water, is sensed by the one or more acoustic sensors, and the processor is configured to process the acoustic energy sensed by the one or more acoustic sensors.

23 Claims, 6 Drawing Sheets

U.S. PATENT DOCUMENTS

| | | | |
|---|---|---|---|
| 5,369,625 A | 11/1994 | Gabrielson | |
| 5,929,370 A | 7/1999 | Brown et al. | |
| 5,955,698 A | 9/1999 | Harkins et al. | |
| 6,142,094 A | 11/2000 | Sullivan et al. | |
| H1938 H | 2/2001 | Harkins et al. | |
| 6,233,202 B1* | 5/2001 | McDonald et al. | 367/5 |
| 6,307,810 B1* | 10/2001 | Shany et al. | 367/131 |
| 6,405,653 B1 | 6/2002 | Miskelly | |
| 6,496,447 B1 | 12/2002 | Gabriel | |
| 6,684,801 B1 | 2/2004 | Kuklinski | |
| 6,707,760 B1* | 3/2004 | Coon et al. | 367/118 |
| 6,714,481 B1* | 3/2004 | Katz et al. | 367/88 |
| 6,739,266 B1 | 5/2004 | Castano et al. | |
| 6,850,186 B2* | 2/2005 | Hellsten | 342/93 |
| 7,052,357 B2 | 5/2006 | Silverglate | |
| 7,206,257 B1 | 4/2007 | Meng | |
| 7,347,146 B1 | 3/2008 | Gieseke | |
| 7,428,870 B1 | 9/2008 | Nedderman | |
| 7,443,764 B1 | 10/2008 | Clark et al. | |
| 2004/0231552 A1 | 11/2004 | Mayersak | |
| 2005/0286345 A1* | 12/2005 | Arvelo et al. | 367/131 |
| 2006/0265927 A1* | 11/2006 | Rapp et al. | 42/84 |
| 2008/0232198 A1* | 9/2008 | Hayasaka et al. | 367/99 |
| 2008/0277195 A1* | 11/2008 | Rapp et al. | 181/157 |
| 2009/0031940 A1* | 2/2009 | Stone et al. | 114/330 |

* cited by examiner

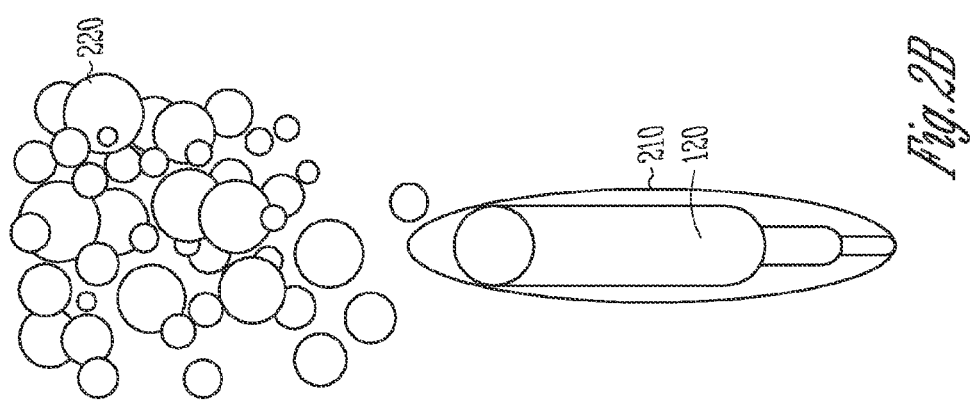
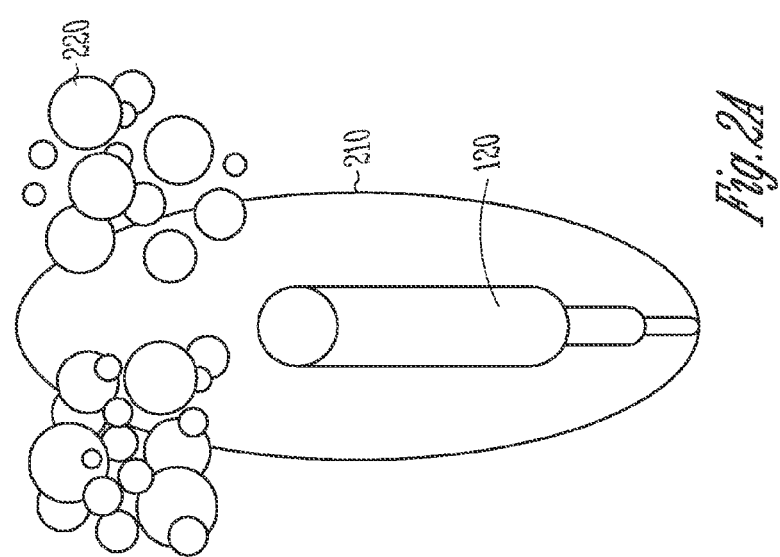

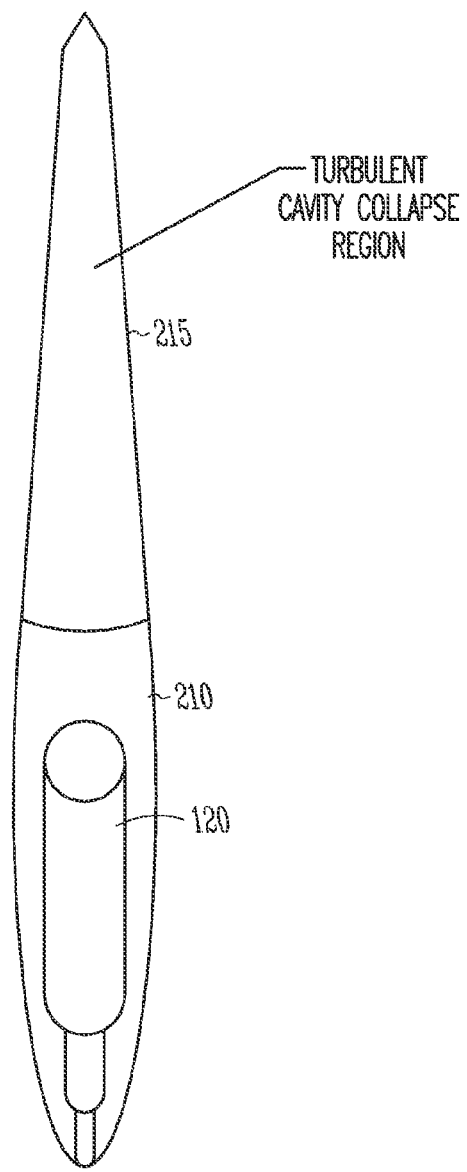

BALLISTIC-ACOUSTIC TRANSDUCER SYSTEM

TECHNICAL FIELD

The current disclosure relates to anti-submarine warfare, and in an embodiment, but not by way of limitation, to the use of acoustic energy in anti-submarine warfare.

BACKGROUND

One aspect of anti-submarine warfare involves the use of acoustic energy to locate submarines or other targets. In such a system, acoustic sensors are positioned in a body of water, such as hydrophones attached to a buoy. An acoustic projector or source then releases acoustic energy. The acoustic energy dissipates throughout the body of water in which the acoustic sensors are placed. Since the location of the sensors and the source of acoustic energy are known or can be easily determined, any submarine or other target within the body of water will absorb and reflect the acoustic energy. This disturbance in the acoustic field by the submarine or other target can be picked up by the acoustic sensors, and the position of the submarine and other information relating to the submarine can be determined. The acoustic energy can be generated by explosives, which are environmentally unfriendly, or other means such as battery powered transducers, which are either short lived or expensive and prone to failure in the harsh conditions at sea. The art would therefore benefit from an improved anti-submarine warfare acoustic detection system.

BRIEF DESCRIPTION OF THE DRAWINGS

FIGS. 2A and 2B illustrate a cavity and bubbling effect of a projectile upon entry into a body of water.

FIG. 3 illustrates a turbulent cavity collapse region upon entry of a projectile into a body of water.

DETAILED DESCRIPTION

Figure 1:
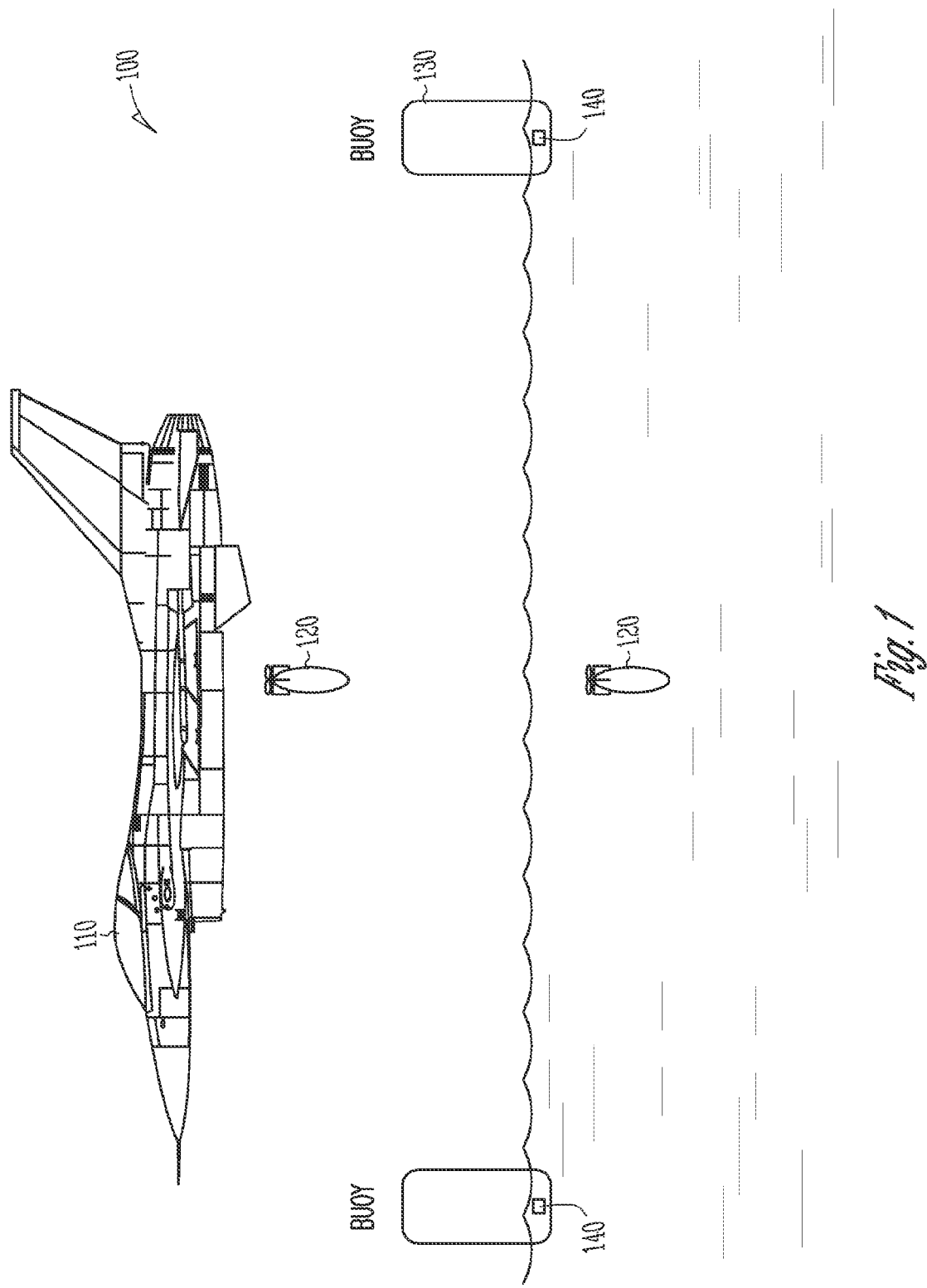
FIG. 1 illustrates an example embodiment of a ballistic-acoustic transducer system.

There is a need for active acoustic transducers, for example in connection with anti-submarine warfare, that are powerful, reliable and relatively inexpensive. In addition, it would be advantageous that such transducers have a long shelf-life and be free of hazards to personnel. Existing active transducers use either battery power or chemical explosives. The use of chemical explosives has an environmental impact and suffers a generally poor public image.

In an embodiment, the kinetic energy of the projectile and the acoustic energy it generates as it enters a body of water is used. The potential energy of a projectile dropped from an aircraft is given by:

$$E = mgh \qquad \text{Eqn. 1}$$

Wherein E is the potential energy in joules,
g is the gravitational acceleration constant (9.78 m/s²)
h is the height above the water in meters
m is the mass of the projectile in kilograms The maximum velocity that the projectile will achieve is given by:

$$v_{max} = \text{sqrt}(2gh) \qquad \text{Eqn. 2}$$

Wherein $v_{max}$ is the maximum velocity the projectile will reach in a vacuum.

In air, the maximum velocity is referred to as the terminal velocity. It is reached when the force of gravity is balanced by the air resistance. Drag is sometimes divided between form and body drag, but for purposes of the current disclosure, they will be combined. Air resistance is approximated by:

$$F_D = C_d \rho A v^2. \qquad \text{Eqn 3.}$$

Wherein $F_D$ is the force due to drag,
$C_d$ is the drag coefficient. $C_d$ depends on the body shape and
Reynolds number. It is normally in the range and 0.1 and 3.
ρ is the density of the fluid (air)
A is the frontal area of the body Thus, the terminal velocity is given by:

$$v_T = \text{sqrt}(g/(C_d \rho A)). \qquad \text{Eqn 4.}$$

Wherein $v_T$ is the terminal velocity in meters per second. Thus the maximum energy available at water entry is given by:

$$E_{max} = mg/(2C_d \rho A). \qquad \text{Eqn 5.}$$

Wherein $E_{max}$ is the energy at terminal velocity.

The actual energy of the projectile at water entry can be determined from empirical drag coefficient data, the body shape of the projectile, and integrating the resulting equations of motion. The energy and velocity will always be less than $E_{max}$ and $v_T$ respectively. It should be noted that while gravity powered projectiles are discussed herein, it is also possible to fire the projectiles from a gun into the water or to use rocket assisted projectiles to improve the energy density at low altitudes. The projectiles themselves can be launched from an aircraft, an Unmanned Air Vehicle (UAV), an Autonomous Air Vehicle (AAV), a cruise missile, a gun, or other artillery pieces. On the assumption that most of the energy is peak, radiated levels will be given by:

$$SL = 171.5 + 10 \log(E_{max}/P_L). \qquad \text{Eqn 6.}$$

Since the available energy at water impact will be on the order of 10 kilojoules up to as much as one mega joule, and the duration of the acoustic generation will range from about 10 milliseconds to about a second, the peak acoustic radiation is expected to be adjustable in the range from about 211 to 260 db/micro Pascal over the entire radiation band.

There are actually three distinct regimes for a projectile moving through the water. The first regime occurs near the surface, where the region behind the projectile is a void space that contains air. This region dissipates rapidly as the projectile moves deeper into the water. The second region depends on the velocity, projectile depth and shape of the projectile. At high enough velocity, cavitation bubbles forms at the tip of the projectile and behind the projectile. If the projectile is properly shaped, these cavitation bubbles can be stable for hundreds of meters (indefinitely if the projectile has propulsion.) FIGS. 2A and 2B illustrate an example of a cavitation region 210 and the cavitation bubbles 220. FIG. 3 illustrates the cavitation region 210 as it collapses at 215. For bodies that are not carefully engineered to sustain super-cavitation (i.e., the cavity does not collapse on the projectile), the amount of time (and distance) spent in the cavitating mode is very short. In the third region the projectile moves through the water without cavitating. All bodies that enter the water with sufficient depth will end up in this third region until they are stopped by the bottom. As with an object falling through air, the projectile will quickly achieve a terminal velocity. This terminal velocity will be about a factor of 30 lower than in air due to the density differences between air and water. Each of these three regimes can be exploited to generate acoustic energy in the water.

The impact regime will result in acoustic radiation for all types of projectiles. The impact regime occurs at the air-water interface. Projectiles designed to dissipate all of their energy on impact with the surface will operate exclusively in the impact regime. Such projectiles will produce a strong, shock-like pulse of acoustic energy. One embodiment of an impact-regime projectile is an aerodynamic body that deploys large retardation fins on impact with water.

In the first regime the acoustic emissions will initially be dominated by impact of the projectile with the water. Once the cavity has formed, the air bubbles will be excited by the turbulent collapse of the cavity. Each air bubble will resonate at a characteristic frequency that will depend on its size and depth. The radiation from each air bubble will decay rapidly. The maximum dimensions of the air bubbles will be on the order of the cavity diameter but there will be a distribution of smaller bubbles. The smaller bubbles will be generated both by the initial collapse of the tail of the cavity and by fissioning of smaller bubbles. Once the air initially entrained in the cavity is exhausted this mode will cease to radiate.

The resonant frequency of a gas filled bubble in water can be given as:

$$f_r = \text{sqrt}(3 \gamma P_0/\rho)/(2\pi a).$$ Eqn 7.

Wherein $f_r$ is the resonant frequency of the bubble in hertz,
$P_0$ is the ratio of specific heats of gas,
$\gamma$ is hydrostatic pressure,
$\rho$ is the density of seawater and
$a$ is the radius of the bubble in centimeters.
Eqn 7 can be simplified to:

$$f_r = 326 \text{ sqrt}(1+0.03d)/a.$$ Eqn 8.

Wherein d is the depth of the seawater in feet.

The cavity of a projectile that operates in the air-bubble regime will typically range from a little larger than the projectile's diameter to perhaps five times that diameter. This implies that the spectral peak for this mode of a ballistic transducer will range from about a few hertz up to perhaps 300 hertz. It will however be difficult to sustain the lower frequency radiation because the larger bubbles will tend to shatter very rapidly due to Rayleigh instabilities. It should also be noted that the initial collapse will tend to be very sharp and shockwave like. This will also result in higher frequency content with a more white noise like character. In some sense, this mode behaves like a weak explosive pulse, but it will not generate the initial strong shock wave. This regime appears to offer only limited opportunity to engineer an acoustic signal. However, by controlling the drop altitude, water entry velocity, and shape and weight of the projectile, some tuning of peak radiated frequencies is available. Total energy in the pulse will be controlled by the weight and velocity of the projectile.

A projectile in the super cavitation regime forms a void via the tip of the projectile. This avoids body drag and significantly increases the range of the projectile. The void collapses behind the body, producing a rapid series of shock waves. The shock wave collapse times will be on the order of:

$$\tau_{sw} = r_c/v.$$ Eqn 9.

Wherein $\tau_{sw}$ is the bubble collapse time,
$r_c$ is the radius of the cavity and
$v$ is the velocity of the projectile through the water.

For a typical, super cavitating projectile in the size and weight range anticipated for ballistic transducers, the collapse times will be on the order of 0.3 to several milliseconds. In this mode the spectrum should peak at between 1 and 3 kilohertz. The length of the super cavitation will depend on the projectile energy and design. The maximum length is determined by the energy in the projectile and the required energy to form the cavity. The energy required to form the cavity is determined by the cavity diameter and hydrostatic pressure as a function of depth. In addition there will be losses due to heating of the ocean water at the tip.

The diameter of the cavity can be estimated using Bernoulli's law. A simplified form of this law for incompressible fluids is $$PA + \rho v^2/2 = \text{constant}$$

Wherein P is the pressure of the flow,
A is the area of the flow,
$\rho$ is the fluid density and
$v$ is the velocity of the flow.
The flow is stagnant on the tip and in the cavity wall when the cavity reaches its maximum diameter and the area of the out flow to the area of the stagnant segment of the cavity wall is:

$$P_0 = A_{tip} P_{tip}/(2\pi r_c).$$ Eqn 10.

Wherein $P_0$ is the hydrostatic pressure,
$A_{tip}$ is the area of the tip,
$P_{tip}$ is the pressure on the tip,
$r_c$ is maximum cavity radius
The pressure at the tip of the projectile is approximately:

$$P_{tip} = \rho v^2/2.$$ Eqn 11.

Thus, the maximum cavity diameter is given by:

$$r_c = A_{tip} \rho v^2/(4\pi P_0).$$ Eqn 12.

Super cavitation ceases when the cavity impinges on the body of the projectile. Cavitation ceases at some smaller velocity that is governed by the shape of the projectile and the ratios of the dynamic to static pressure at a given depth. The duration of the supper cavitation can be determined by integrating the energy supplied to form the cavity from the instant that super cavitation begins until the cavity impinges on the body of the projectile with the projectile's velocity being reduced as its kinetic energy is consumed to form the cavity.

The rate that energy is supplied to the form the cavity is given by:

$$dE_{projectile}/dt = P_{tip} v A_{tip}$$
$$= \rho A_{tip} v^3 / 2.$$ Eqn 13.

For a typical sub-caliber round the distance over which super cavitation can be achieved is on the order of a couple hundred meters. Longer distances are possible for larger rounds.

Super cavitating projectiles tend to periodically slap the wall of the cavity as they move through the water. Normally, such projectiles are designed to minimize wall contact. In one or more embodiments however, this behavior is enhanced and controlled. By addition of fins and projectile design (mass, tip diameter, length, land locations and center of gravity), this behavior may be engineered to produce particular frequencies. This will produce a harmonic sequence of frequency modulated tones.

The super cavitation regime admits to several innovations that can allow the production of tones. The first modification changes the shape of the tip. The cavitation cavity can be shaped so that it collapses asymmetrically. The spiraling asymmetry is produced by spinning the projectile—resulting in periodic modulation of the broadband noise produced by the collapse of the cavitation bubbles. To keep the forces on the tip in balance, there may be multiple asymmetries on the tip:

2 asymmetries at 180 degrees rotation
3 asymmetries at every 120 degrees rotation
4 asymmetries at every 90 degrees rotation
5 asymmetries at every 72 degrees rotation and so on . . .

The frequency of the periodic modulation is then given by the instantaneous spin rate in Hertz multiplied by the number of tip asymmetries. The spin rate of a projectile is well known to decay over time due to drag. This spin decay will produce a useful frequency shift (sometimes known as frequency modulation) of the periodic modulation of the broadband noise, which is well known to enhance acoustic detection of submerged objects. The initial spin rate can be set during the fall through the atmosphere using aerodynamic fins that detach prior to water entry. Alternatively, the initial spin rate can be set by the rifling of a barrel when shooting the projectile with a gun or other artillery piece.

The second modification vents a portion of the fluid at the tip of the projectile through the projectile and into the cavitation cavity. This will modify the pressure at the tip of the projectile and thus the dimensions of the cavity. By modulating the flow of fluid through the tip orifice, both the tip pressure and cavitation cavity diameter will be modulated, replicating the modulation into the radiated acoustic signal. These tones will still ride on a broadband noise component. The modulation of the flow through the tip orifice can be accomplished using either a siren type mechanism (rotating, perforated disk) or a whistle/organ-pipe type mechanism. That is, an edge to disturb the flow and resonant chamber to provide feedback.

In the non-cavitating mode, the projectile converts 10 joules potential energy per meter-kilogram as it falls through the water column. About half of this energy can be converted to acoustic energy. A dense, ten kilogram projectile will have a terminal velocity between 10 and 30 meters per second. However, a velocity closer to the lower value will be achieved when extracting energy. This implies that a ten kilogram projectile can extract usable energy at the rate of 250 joules per second. Normally ping rates will be on the order of once per second to once every ten seconds. Pulse lengths are typically on the order of 1 millisecond (higher ping rates) to one second (lower ping rates.) This implies that the instantaneous source levels will be on the order of 210 to 220 dB re a micro Pascal at one meter. In practice the transmit levels will tend to be limited by the area available for the transducer.

In an embodiment, a projectile includes a means of harvesting the kinetic energy of the projectile, a means of storing the harvested energy, a control system to manage the energy transfer, and a means of converting the stored energy to acoustic energy. (See FIG. 5) The energy harvesting can consist of a set of fins and an impeller/screw. The energy conversion/storage elements can be either separate or integrated. One embodiment consists of a generator and a battery/super capacitor. Another embodiment consists of fly-wheel. Yet other embodiments could consist of a pump and a hydraulic accumulator. This later embodiment would be limited in its depth of operation.

Another embodiment consists of a thermoelectric device placed on or within the projectile to capture the thermal gradient between the extremely hot super-cavitation tip and the extremely cold penetrator body, which occurs immediately following the transition from the super-cavitating mode to the non-cavitating mode. The hot tip may also be retracted into the penetrator body to reduce unnecessary heat loss into the cold seawater and convert more heat into electric energy. Small solid state thermal-electric devices are well known in the art, and can be coupled to a battery or a super capacitor, which are also well known in the art.

Figure 4:
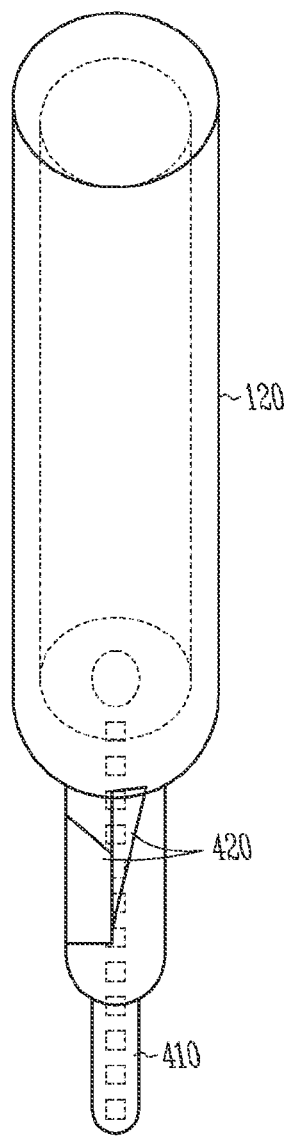
FIG. 4 illustrates an example embodiment of a projectile with an attached whistle.

The acoustic transducers can be electric, magnetic, mechanical, or hydraulic. The electric and magnetic transducers will typically be similar to those used in traditional sonobuoys. Mechanical transducers include ratchets and repetitive hammers. Hydraulic transducers include whistles and siren type mechanisms. FIG. 4 illustrates and example embodiment of a projectile 120 that includes a whistle mechanism 410, 420. A projectile 120 can also include a siren mechanism.

Control mechanisms will typically include electronics to control the pulse timing, type, and duration. These controls will typically be electronic but other timing mechanisms are possible. In practice, the pulses will be emitted at 10 to 100 meter depth increments as the ballistic transducer descends. This implies that the unit can have an operational life on the order of 600 seconds in deep ocean water.

For the whistle and siren modes of operation, it will be more difficult to store the energy. In practice these modes may emit continuous or depth varying tones. These modes will have source level in the 180 to 190 db re micro Pascal range. The tone frequency can be directly coupled to the depth by allowing the natural compression of air in a resonant chamber to control the frequency of the tone. Ideally, the slew rate of the tone's frequency should be high compared with target Doppler to facilitate signal processing and reduce range ambiguity.

Referring now to the Figures, FIG. 1 illustrates a ballistic acoustic transducer system 100. The system 100 includes a processor. The processor can be located on a surface vessel (not pictured), an air vehicle 110, or on a buoy 130. In an embodiment, there are typically a plurality of buoys 130 positioned around a body of water. The buoys 130 include an acoustic sensor 140. The acoustic sensors 140 can be hydrophones. In an embodiment, an aircraft 110 releases a non-explosive projectile 120. The projectile 120 falls towards and into the water. As the projectile 120 impacts, enters, and travels through the water, acoustic energy is generated, and this acoustic energy is sensed by the plurality of acoustic sensors 140. The processor is configured to process the acoustic energy sensed by the one or more acoustic sensors. Additionally, the acoustic energy generated by the entry of the projectile 120 into the water will be absorbed by and reflected by any target, such as a submarine, that is within the acoustic energy field. The acoustic sensors 140 can detect the disturbance caused by the absorbance and reflectance of the acoustic energy by the target, and information about the target can be gleaned from this disturbance. The system 100 can include a supercavitating projectile that generates a predefined cyclic tail, fin, or flare contact with its associated water cavity, thereby generating a specific acoustic signature.

As noted previously, there are several distinct regimes for such a projectile 120 as it impacts, enters, and travels through the water. The acoustic sensors and processor can be configured to sense and process each one of these regimes. For example, the processor can be configured to process the acoustic energy generated by contact of the projectile with the body of water. In another embodiment, the processor can be configured to process acoustic energy generated by a collapsing cavity resulting from entry of the projectile into the body of water. As another example, the processor can be configured to process acoustic energy that is generated by collapsing air bubbles resulting from entry of the projectile into the body of water and sinking of the projectile in the body of water.

Figure 5:
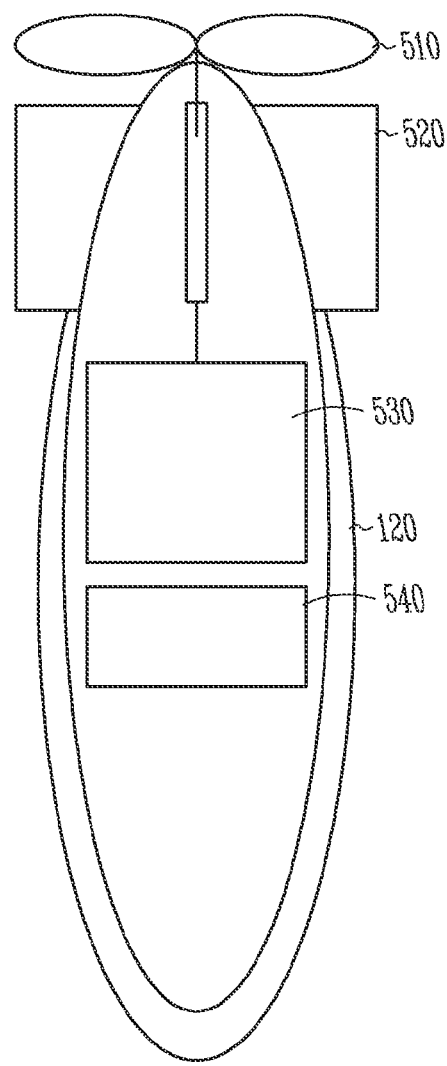
FIG. 5 illustrates an example embodiment of a projectile with an impeller and a current generating system.

FIG. 5 illustrates an example embodiment of a projectile 120 that includes an impeller 510, fins 520, an energy conversion and storage system 530, and a control system 540. In addition to the fins 520 that are illustrated in FIG. 5, the projectile 120 could also have a flare, a tapered nose, or a stepped nose. The energy conversion and storage system can include a power generating system coupled to the impeller to generate an electric current. In an embodiment, this can be a simple magnet and coil system. The energy conversion and storage system 530 can further include a transducer coupled to it. The transducer can convert the electric energy to acoustic energy that can then be used in the system 100 as explained throughout this disclosure. The transducer can include a siren, a speaker, a whistle, or a mechanical device. The electric energy can also be used in conjunction with a control system 540. As previously noted, the control system 540 can manage energy transfer and conversion of the stored energy to acoustic energy.

Figure 6:
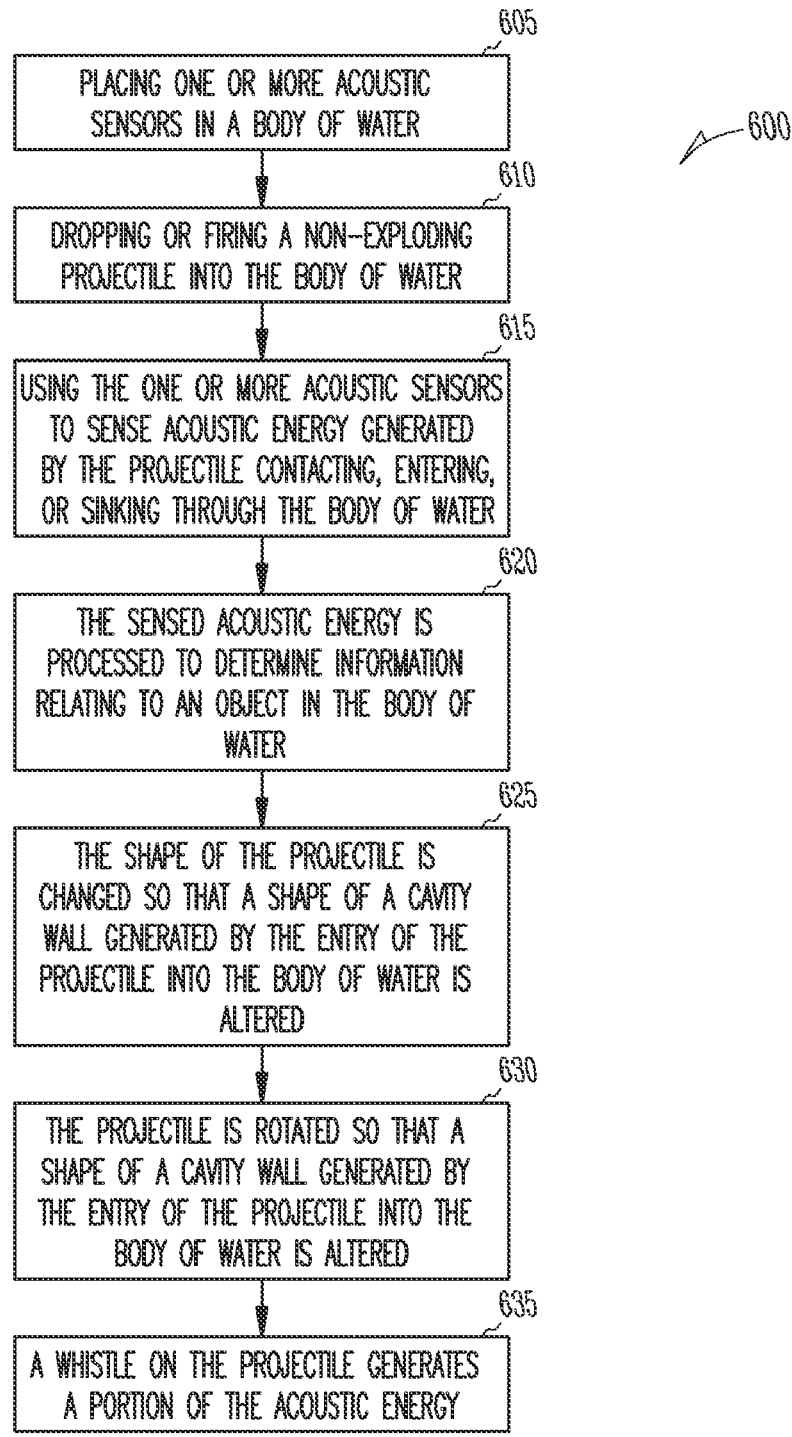
FIG. 6 illustrates a flowchart of an example embodiment of a process to sense acoustic energy in a ballistic transducer system.

FIG. 6 illustrates a flow chart of an example embodiment of a process 600 of using acoustic energy generated by the impact of a projectile with a body of water, an entry of the projectile into the body of water, and the sinking of the projectile through the body of water, to glean information about a target in that body of water. FIG. 6 includes a number of process blocks 605-635 Though arranged serially in the example of FIG. 6, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 6, the process 600 includes placing one or more acoustic sensors in a body of water at 605, dropping or firing a non-exploding projectile into the body of water at 610, and using the one or more acoustic sensors to sense acoustic energy generated by the projectile contacting, entering, or sinking through the body of water at 615. At 620, the sensed acoustic energy is processed to determine information relating to an object in the body of water. At 625, the shape of the projectile is changed so that a shape of a cavity wall generated by the entry of the projectile into the body of water is altered. Different shapes can be experimented with to determine the shapes that work best in any particular application. At 630, the projectile is rotated so that a shape of a cavity wall generated by the entry of the projectile into the body of water is altered. At 635, a whistle on the projectile generates a portion of the acoustic energy.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, which are hereby incorporated into the Detailed Description, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a processor; and
one or more acoustic sensors positioned in a body of water and in communication with the processor;
wherein the system is configured such that acoustic energy generated by a non-explosive projectile is sensed by the one or more acoustic sensors;
wherein the processor is configured to process the acoustic energy sensed by the one or more acoustic sensors; and
wherein the processor is configured to process acoustic energy that is generated by collapsing air bubbles resulting from entry of the projectile into the body of water and sinking of the projectile in the body of water.

2. The system of claim 1, wherein the processor is configured to process the acoustic energy generated by contact of the projectile with the body of water.

3. The system of claim 1, wherein the processor is configured to process acoustic energy generated by a collapsing cavity resulting from entry of the projectile into the body of water.

4. The system of claim 1, wherein the processor is configured to process the acoustic energy to determine information relating to an object in the body of water.

5. The system of claim 1, further comprising the non-explosive projectile.

6. The system of claim 5, comprising one or more of a whistle or a siren coupled to the projectile.

7. The system of claim 5, wherein the projectile comprises one or more fins, a flare, a tapered nose, or a stepped nose.

8. The system of claim 5, wherein the projectile comprises a supercavitating projectile that generates a predefined cyclic tail, fin, or flare contact with its associated water cavity, thereby generating a specific acoustic signature.

9. The system of claim 5, comprising a thermoelectric device coupled to the projectile.

10. The system of claim 5, wherein the projectile comprises:
an impeller;
a power generating system coupled to the impeller to generate an electric current; and
a transducer coupled to the power generating system to convert the electric current into acoustic energy.

11. The system of claim 10, wherein the projectile comprises a means of self propulsion.

12. The system of claim 10, wherein the transducer comprises a siren, a speaker, a whistle, or a mechanical device.

13. The system of claim 1, wherein the acoustic sensors comprise hydrophones positioned on a buoy.

14. A process comprising:
placing one or more acoustic sensors in a body of water;
dropping or firing a non-exploding projectile into the body of water; and
using the one or more acoustic sensors to sense acoustic energy generated by the projectile contacting, entering, and traveling through the body of water, and the acoustic energy generated by collapsing air bubbles resulting from entry of the projectile into the body of water and sinking of the projectile in the body of water.

15. The process of claim 14, comprising processing the sensed acoustic energy to determine information relating to an object in the body of water.

16. The process of claim 14, comprising changing the shape of the projectile so that a shape of a cavity wall generated by the entry of the projectile into the body of water is altered.

17. The process of claim 14, comprising rotating the projectile so that a shape of a cavity wall generated by the entry of the projectile into the body of water is altered.

18. The process of claim 14, comprising using a whistle on the projectile to generate a portion of the acoustic energy.

19. The process of claim 14, comprising venting a portion of water through the projectile and into a cavity in the water formed by the projectile.

20. A system comprising:
   a processor;
   one or more acoustic sensors disposed in a body of water and in communication with the processor; and
   a non-exploding projectile comprising:
      an impeller;
      a power generating system coupled to the impeller to generate an electric current; and
      a transducer coupled to the power generating system to convert the electric current into an acoustic energy.

21. The system of claim 20, wherein the processor is configured to process the acoustic energy to determine information relating to an object in the body of water.

22. The system of claim 20, wherein the power generating system comprises one or more of a generator, a battery, a capacitor, a fly-wheel, a pump, and a hydraulic accumulator.

23. The system of claim 20, wherein the transducer comprises a siren, a speaker, a whistle, or a mechanical device.

* * * * *